United States Patent [19]

Porter et al.

[11] 4,435,376
[45] Mar. 6, 1984

[54] FIBROUS CARBON PRODUCTION

[75] Inventors: Randall A. Porter; Larry E. Reed, both of Bartlesville, Okla.

[73] Assignee: Phillips Petroleum Company, Bartlesville, Okla.

[21] Appl. No.: 362,349

[22] Filed: Mar. 26, 1982

[51] Int. Cl.³ .................... D01F 9/12; C01B 31/02; C01B 3/24
[52] U.S. Cl. ................... 423/447.3; 423/449; 423/453; 423/458; 423/650
[58] Field of Search ............. 423/447.1, 447.2, 447.3, 423/447.7, 453, 458, 459, 650, 449; 201/29

[56] References Cited

U.S. PATENT DOCUMENTS

| | | | |
|---|---|---|---|
| 1,717,354 | 6/1929 | Burwell | 423/450 |
| 1,868,921 | 7/1932 | Schmidt et al. | |
| 1,946,739 | 2/1934 | Gyeru | |
| 2,760,847 | 8/1956 | Oblad et al. | 423/453 |
| 2,796,332 | 6/1957 | Pollock | 423/650 |
| 3,156,734 | 11/1964 | Happel | 423/650 |
| 3,411,949 | 11/1968 | Hough | 423/450 |
| 4,280,876 | 7/1981 | Green | 201/29 |

FOREIGN PATENT DOCUMENTS 324959 2/1930 United Kingdom ............... 423/453

OTHER PUBLICATIONS

Baker et al., Journal of Catalysis, vol. 26, pp. 51–62, (1972).
Walker, *Chemistry and Physics of Carbon*, vol. 5, pp. 3–7 and 52–70.

Primary Examiner—Edward J. Meros
Assistant Examiner—Steven Capella

[57] ABSTRACT

The production of fibrous carbon from hydrocarbons can be improved by employing recycled hydrocarbons as carrier gases.

13 Claims, 1 Drawing Figure

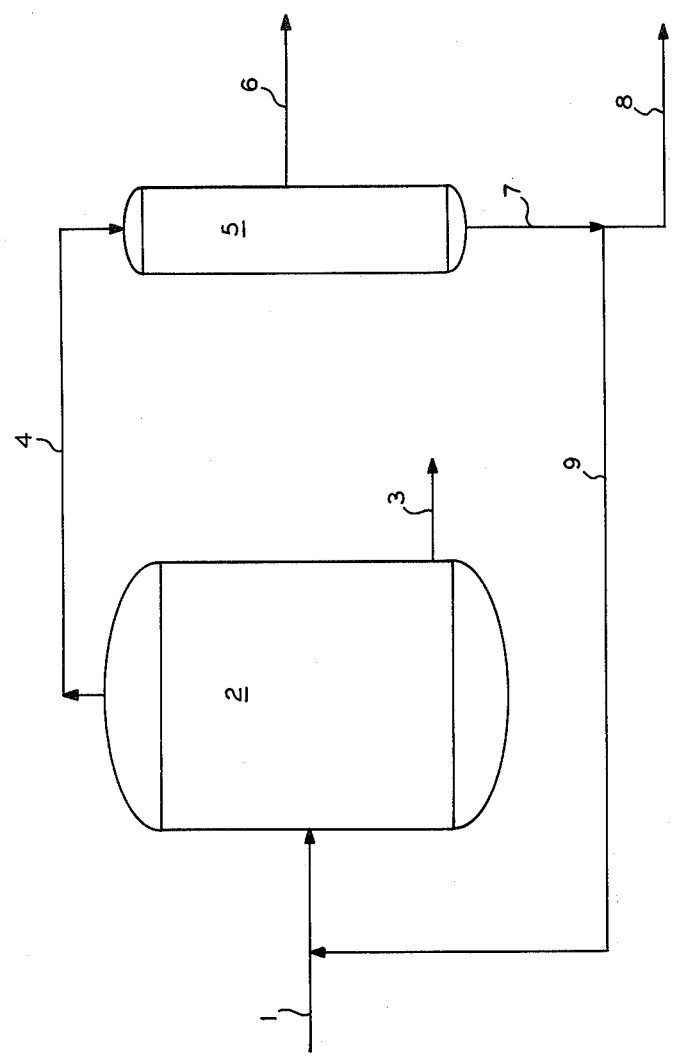

FIBROUS CARBON PRODUCTION

BACKGROUND

In catalytic pyrolysis reactions to produce fibrous carbon from hydrocarbons, a carrier gas, such as nitrogen, can be employed. Nitrogen is a relatively expensive carrier since it must be separated from oxygen via costly procedures.

It has been discovered that the need for large quantities of nitrogen carrier gas can be eliminated by recycling a portion of the gas effluent from a pyrolysis reactor.

THE INVENTION

In accordance with the invention, a carbonaceous feed, such as hydrocarbon, is mixed with an inert carrier gas and then fed into a pyrolysis reactor containing a catalyst where, under suitable conditions, fibrous carbon particles are formed.

Normally, the effluent from the reactor, which contains a mixture of unreacted carbonaceous material, lower molecular weight carbonaceous species, and carrier gas, is discarded. Further pyrolysis takes place with feeds containing fresh carrier gas and fresh hydrocarbons.

This invention rests on the discovery that the effluent from the pyrolysis reactor can be treated to remove unwanted components and then substituted for all or part of the carrier gas in subsequent hydrocarbon feeds.

OBJECTS OF THE INVENTION

It is an object of the invention to reduce the amount of externally-supplied carrier gas which must be employed in a catalytic pyrolysis operation.

It is another object of the invention to provide a pyrolysis process in which the need for costly nitrogen/oxygen separation is minimized.

It is still another object of the invention to provide a method of making fibrous carbon in which unreacted hydrocarbon feed is recycled to the reaction zone.

Yet another object of the invention is to provide a process by which pyrolytic effluents are mixed with carrier gas to produce a carbonaceous feed.

DESCRIPTION OF THE INVENTION

The Carbonaceous Feed

The carbonaceous feed used in this invention contains one or more hydrocarbon compounds. While inorganic carbon compounds, such as carbon monoxide, can be included, the most preferred feeds are liquids or gases containing only hydrocarbon molecules. Alkanes are preferred. $C_{4-10}$ alkanes are most preferred. Mixtures of hydrocarbons can be used.

The carbonaceous feed is introduced into the reaction zone in a gaseous carrier. Suitable carriers include argon, xenon, and similar materials. Nitrogen and nitrogen-containing mixtures which exclude oxygen are preferred carriers.

Useful dilution ratios for the mixture of carriers with carbonaceous material are 0.5:1 to 15:1, based on the volume of gaseous feed.

The Catalyst Component

Useful catalysts include the free metals and compounds of the metals in Group VIII of the Periodic Table. Preferred metals include iron, cobalt, and nickel. Nickel is most preferred. Combinations of any of these are operable, e.g., $CoNiTiO_4$, and $Co_{0.5}Ni_{0.5}TiO_3$.

When metal compounds are employed, the anionic portion of their molecules may be simple or complex. Among the useful complex anions are those containing elements from Groups IV, V, and VI of the Periodic Table. Titanates are preferred.

The Pyrolysis Reactor

Suitable reactors are those in which large volumes of carbon can be accommodated and good contact between the catalyst and the carbonaceous feed is assured.

Reaction Conditions

The reaction takes place under suitable catalytic pyrolysis conditions. Typically, these conditions depend on such variables as temperature, pressure, and the nature, quantity, and flow rate of the hydrocarbon feed. In general, suitable conditions are those under which the feed/carrier combination contacts the catalyst and microfibrous carbon is formed.

The temperatures used for the catalytic pyrolysis of the carbonaceous feed will range from 500° to 800° C., with 700° C. preferred.

The pressures employed during reaction will be such that the carbonaceous feed is gaseous. Generally pressures of 1 to 2 atm can be used.

The hydrocarbon feed is usually a liquid or gas and can be pretreated in order to facilitate its admixture with the carrier. The original hydrocarbon/carrier feed is introduced into the reactor at a GHSV within the range of 1,000 to 100,000 $hr^{-1}$ with 10,000 to 35,000 $hr^{-1}$ preferred. The hydrocarbon/recycled effluent feed is introduced into the reactor at the same GHSV.

The Recycling Operation

The hydrocarbon-containing effluent from the reactor is rich in hydrogen and low molecular weight hydrocarbon species. The recycling phase of the process of the invention includes the steps of treating the effluent to remove at least some of the hydrogen therefrom and, optionally, removing excess hydrocarbon from the remaining hydrocarbon mixture.

All or part of the hydrogen component of the effluent is removed via conventional separation or hydrogen removal techniques. Suitable techniques include cryogenic separation, and pressure Swing absorption.

After removal of a substantial amount of the hydrogen present, the remaining effluent fraction contains a mixture of hydrocarbons, most of which are inert with respect to the pyrolysis reaction. Depending upon the nature of the initial feed, the molecular species present will be various molecules containing one or more carbon atoms. Normally, one of the major constituents of this effluent fraction will be methane. Excess methane byproduct can be purged from the effluent before or after the effluent is treated to remove hydrogen. Suitable processes for removing the methane include cryogenic separation and the like.

In one embodiment of the invention, butane is mixed with nitrogen carrier and introduced into the pyrolysis zone. The fibrous carbon is removed from the reactor as bottoms product. The effluent, which contains unreacted butane, propane, ethane, methane, and hydrogen is removed. This effluent is treated to remove hydrogen and purged of excess methane. The treated effluent, which is mostly methane, is used as a carrier, with or without additional nitrogen, for a fresh butane feed. The cost of the total process is much lower than conventional processes in which the pyrolysis reactor effluent is discarded and the only carrier for the hydrocarbon feed is nitrogen.

The amount of treated effluent which passes to the reaction will usually be between 10 and 90 vol. %, based on the volume of the total feed/carrier combination. When nitrogen gas is admixed with the treated effluent, its concentration is between 0 and 90 vol. %, based on the volume of the total feed/carrier combination.

The recycling operation in the inventive process makes it highly cost effective since the hydrocarbon effluent from initial or early reactions is the principal source of carrier gas for subsequent reactions. The recycled gas will contain very little reactive hydrocarbon, mostly $CH_4$, and only excess $CH_4$ would be used outside the system.

THE DRAWING

A typical flow diagram is depicted in the FIGURE. Carbonaceous feed 1 is introduced into reactor 2 from which carbon particles are withdrawn at 3 and overhead effluent 4 passes into separator 5. Hydrogen is removed from separator 5 as stream 6. The heavier product 7 is purged to remove excess methane as stream 8. The remainder of product 7 is recycled, via stream 9, to be mixed as a component of feed 1 for passage to reactor 2.

EXAMPLE

A feed containing 91% $N_2$ diluent (300 cc/min) and 9% butane (30 cc/min) was passed over 1 g $NiTiO_3$ catalyst at 700° C. in a pyrolysis reactor. Gas chromatographic analysis showed the effluent and the composition shown at 1 hr in the table below. Based on this data, the remainder of this example was calculated showing the expected composition of the effluent at 24 hr in the table below.

After cryogenic separation to remove $N_2$ and $H_2$, the recycle gas will be 97% $CH_4$ (about 30 cc/min initially), 3% $C_2$. The recycle gas is then combined with $N_2$ diluent and fresh feed. The flow rate of $N_2$ diluent is decreased in direct proportion to the increase of recycle gas volume such that the total $N_2+CH_4+C_{2+}=300$ cc/min. When all the $N_2$ has been replaced (approximately 10 passes through the reactor), the excess recycle gas is removed via a slip stream to be utilized as fuel. At equilibrium (24 hr) the reactor effluent should have the composition given in the table.

TABLE

| | (Effluent composition) | | | | |
|---|---|---|---|---|---|
| Time | Vol % $H_2$ | Vol % $N_2$ | Vol % $CH_4$ | Vol % $C_2$ | Vol % $C_3$ |
| 1 hr | 23 | 70 | 7 | 0.2 | 0 |
| 24 hr | 16 | 0 | 82 | 1.5 | 0.1 |

Reasonable variations, such as would occur to a skilled artisan, may be made in the invention without departing from the scope thereof.

We claim:

1. A process of decreasing the amount of externally-supplied carrier gas required in a pyrolysis operation for producing carbon particles from a carbonaceous feed comprising alkanes having from about 4 to about 10 carbon atoms comprising the steps of: (1) pyrolyzing the feed in a pyrolysis zone at a temperature ranging from about 500° C. to about 800° C., (2) removing hydrocarbon-containing effluent from the pyrolysis zone, (3) treating the effluent to remove hydrogen therefrom, and (4) employing the treated effluent as a carrier for carbonaceous feed to the pyrolysis zone.

2. The process of claim 1 wherein excess methane is purged from the effluent between steps (2) and (4).

3. A process for pyrolyzing carbonaceous materials comprising $C_4$-$C_{10}$ alkanes to produce carbon, which process includes the steps of: (1) pyrolyzing the feed in a pyrolysis reactor in the presence of a Group VIII catalyst at a temperature ranging from about 500° C. to about 800° C., (2) removing hydrocarbon-containing effluent from the pyrolysis reactor, (3) treating the effluent to remove hydrogen therefrom, and (4) employing the treated effluent as a carrier for carbonaceous feed to the pyrolysis reactor.

4. In a process of producing carbon fibers by pyrolyzing carbon-containing substances comprising alkanes having from about 4 to about 10 carbon atoms in a pyrolysis reactor temperatures ranging from about 500° C. to about 800° C. in the presence of carrier gases, the improvement comprising the steps of (1) removing hydrocarbon-containing effluent from the pyrolysis reactor, (2) treating the effluent to remove hydrogen therefrom, and (3) employing the treated effluent as a carrier for carbonaceous feed to the pyrolysis reactor.

5. The process of claim 4 wherein the pyrolysis reaction takes place at about 700° C.

6. The process of claims 2 or 4 wherein step (3) includes a demethanizing operation.

7. The process of claim 5 wherein the carbon-containing substance employed comprises butane.

8. The process of claim 6 wherein the feed comprises butane.

9. A process of producing carbon particles comprising the steps of:
   (1) introducing a carbonaceous feed comprising $C_4$-$C_{10}$ alkanes and an inert diluent into a pyrolysis zone,
   (2) pyrolyzing the feed in the presence of a catalyst to yield carbon,
   (3) removing hydrocarbon-containing effluent from the pyrolysis zone,
   (4) treating the effluent to remove hydrogen therefrom, and
   (5) recycling the treated effluent of step (4) as a carrier for fresh carbonaceous feed to replace part of the inert carrier.

10. The process of claim 9 wherein step (5) is repeated until all of the inert carrier has been replaced by recycled effluent.

11. The process of claim 10 comprising the additional step of removing excess recycled effluent via a slip stream.

12. The process of claim 11 wherein the excess recycled effluent is utilized as fuel for the pyrolysis reaction.

13. The process of claim 12 wherein the carbonaceous feed comprises butane.

* * * * *